Feb. 10, 1931. J. M. CRAWFORD 1,791,802
SERVICE BRAKE EQUALIZER
Filed Feb. 6, 1928
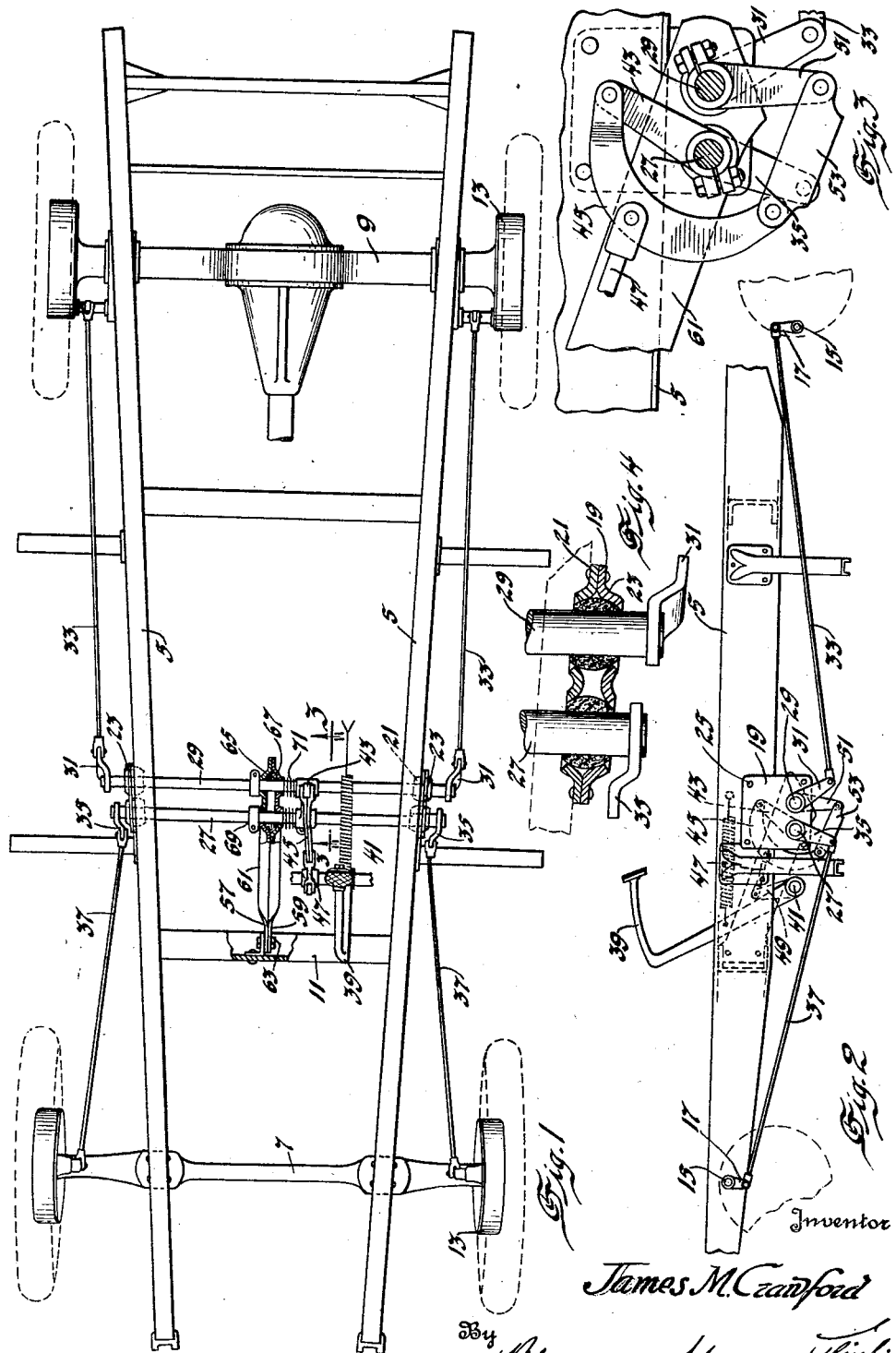
Inventor
James M. Crawford
By
Attorneys Patented Feb. 10, 1931

1,791,802

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

SERVICE-BRAKE EQUALIZER

Application filed February 6, 1928. Serial No. 252,224.

This invention relates to brakes. It is concerned with the operating mechanism for applying the front and rear wheel brakes of a vehicle, and includes mechanism to equalize the pedal effort between the front and rear wheel brakes.

An object of the invention is to provide a comparatively simple hook-up making use of inexpensive parts and one which shall make possible equalization between the brakes at the front and at the rear.

As another object the invention introduces a resistance member to prevent distortion of the supporting means for cross shafts used in connection with the operating mechanism. Other objects and advantages will be understood from a reading of the following specification and an examination of the drawing.

In the drawing:

Figure 1 is a plan view of the chassis of a motor vehicle having the novel brake operating mechanism incorporated therein.

Figure 2 is a side elevation of a portion of the chassis frame.

Figure 3 is a detail in side elevation and on an enlarged scale, the view being taken on line 3—3 of Figure 1.

Figure 4 is a sectional view of a detail.

Referring by reference characters to the drawing, numeral 5 represents the side frame members of the chassis. The front axle is shown at 7 and the rear axle at 9. A plurality of cross frame members are used, one being shown at 11. Each wheel is provided with a brake drum 13 within which is brake mechanism, not shown inasmuch as the brake mechanism constitutes no part of the invention. Actuating shafts 15 within the drum are extended outwardly and carry operating arms 17. From the ends of arms 17 rods or other operating means are extended toward the middle of the vehicle where means is provided to pull the adjacent ends of the rods toward each other to apply both the front and the rear brakes, the means being constructed to equalize the pull between the two brakes. Preferably the equalizing means is, as shown, between the two front brakes and the two rear brakes.

At opposite points the frame bars 5 have secured thereto means to rotatably support the ends of two transverse rock shafts. This means comprises two plates, an outer plate 19 and an inner plate 21. The two plates have oppositely directed cupped openings as at 23 through which the shafts may pass. The plates may preferably be normally not parallel and are to be sprung into parallelism and into contact and secured together, the registering pockets defined by the cupped portions carrying spherical bearings. The plates, when brought together, are secured to the frame by fastening means 25. Two shafts, a forward shaft 27 and a rearward shaft 29, are journalled in the plates carried by the frame members for rocking motion in the act of applying the brakes. On the ends of shaft 29 are arms 31. These arms 31 are connected to arms 17 of the rear brakes by links or rods 33. On the ends of shaft 27 are arms 35 which are in a similar manner connected by links 37 to the arms 17 at the front wheel brakes.

From an examination of Figure 2 it will be seen that in action the front brake shaft 27 is to be rotated in a counter-clockwise direction while the rear brake shaft 29 is to be given a clockwise direction. These rotary movements of the shafts are effected simultaneously by the usual brake pedal 39. This pedal is pivoted at 41 at any convenient point. At an intermediate point in its length shaft 27 has secured thereto an upwardly directed arm 43 to the upper end of which is pivoted a forwardly bowed arc-shaped equalizer member 45. To an intermediate point on this equalizer 45 is pivotally connected a link 47, the other end of the link being pivotally connected to an arm 49 associated with the pedal. The points of connection between link 47 and the equalizer 45 is shown as near the middle of the equalizer but if desired provision may be made for other points of connection whereby the equalizer may distribute the braking force applied by the pedal in any desired ratio between the front brakes and the rear brakes. The equalizer 45 extends downwardly from its pivotal connection with arm 43 to a point beneath shaft 27 and its lower end is connected with an arm 51 at the midpoint on shaft 29 by a link 53. It will be understood that pedal pressure pulls forwardly through link 47 and equalizer 45 tending to rotate shaft 27 through the pull upon its arm 43 in a counter-clockwise direction. Such rotation exerts a pull through links 37 and an application of the front wheel brakes. Similarly the pedal may be said to tend to swing the equalizer about its pivotal connection with arm 43 as a center and through the link 53 and arm 51 rotates shaft 29 in a clockwise direction, thereby pulling rod 33 and applying the rear brakes. If considerable resistance is encountered at either brake the other will obviously be actuated until the resistance is equal. Should the front brakes be applied first the pivot between 43 and 45 then becomes a fulcrum about which arm 45 rotates to thereafter apply the rear brakes. Should the resistance at the rear brakes be relatively high equalizer 45 will rotate shaft 27 and apply the front brakes in a manner which will be obvious. Adjustments to compensate for lining wear are preferably made at the brake itself and as these adjustments constitute no part of the present invention they are neither described nor shown.

Since the pull upon shafts 27 and 29 is at an intermediate point at the lengths of these shafts it is found desirable to interpose a resistance member between a frame cross member and intermediate parts of these rock shafts. Such a resistance member is shown in the drawing, perhaps best shown in Figure 1. It is made up of two plates 57 and 59, these plates having oppositely directed flanges 61 for the greater part of their length forming, as it were, channel members. The plates may be secured together by a plurality of fastening means. At their rear end they serve to support and journal the middle portion of the two rock shafts 27 and 29 and at their front end are connected to the frame member 11 by fastening means 63. To provide suitable journals for the shafts the plates, at their rear end, are formed with opposed cup shaped openings 65, these openings being in registration to receive the shafts 27 and 29. Preferably these cup shaped openings may be filled with packing as at 67 to carry lubricant for the rotating cross shafts. It should be observed that the link member 47 is substantially parallel with the long axis of this brace member, and the brace member thus effectively resists any tendency of pedal pressure to distort shafts 27 and 29 between their bearings in the frame members.

The shafts 27 and 29 are held in position transversely by collars 69 secured adjacent the brace member 61, and on the other side of the brace member are coil springs 71 in abutment with the hubs of arms 43 and 51. The other ends of the springs are in abutment with the resistance member as illustrated. A slight degree of lateral movement is thus afforded the shafts 27 and 29.

By the provision of the brake operating means as described there is secured a balanced action between the two front brakes and the two rear brakes. Any rotation of the shaft 29 operates both front brake rods 37 to the same extent. No equalized action is arranged between the two front brakes. It is intended to so arrange the actuating means at each front wheel that, when the brake is applied, a joint shall be so related to the wheel swivelling axis that wheel steering shall not affect the intensity of brake action. Adjustment to attain this result may be made in several ways and is not a part of this invention and is therefore not illustrated. In a similar way the rear wheel brakes are not provided with equalized action between themselves, it being deemed better to provide suitable adjustment at each wheel brake.

The mechanism operates however, through the bar 45 to serve as an equalizer between front and rear brakes and by varying the point of contact between parts 47 and 45 it is possible to predetermine the ratio between the front brakes and the rear brakes as desired.

I claim:

1. Brake operating means for vehicles including parallel cross shafts, terminal arms on said shafts for connection with brakes, an intermediate arm on the first one of said shafts, an oppositely directed intermediate arm on the second of said shafts, an equalizer terminally pivoted to said first arm, a link connected at one end to the other end of said equalizer and at its other end to said second arm, manually operable means, link means connected to said manually operable means and to said equalizer, said intermediate arms located substantially in the same plane and a brace member substantially parallel to said link means and secured to the frame of said vehicle and having bearings for said cross shafts.

2. Brake operating mechanism for vehicles having side members and a cross member comprising two adjacent rock shafts, means carried by the vehicle side members to rotatably support said rock shafts, a brace member having journals for said rock shafts at intermediate positions on the latter, said brace member formed with an integral extension terminally secured to a cross frame member.

3. The invention defined by claim 2 together with operating means for rotating said rock shafts including a connecting member substantially parallel to said brace member.

In testimony whereof I affix my signature.

JAMES M. CRAWFORD.